United States Patent
Jeong (10) Patent No.: US 10,596,949 B2
(45) Date of Patent: Mar. 24, 2020

(54) LUGGAGE LOADING AND UNLOADING APPARATUS FOR VEHICLE

(71) Applicants: Hyundai Motor Company, Seoul (KR); Kia Motors Corporation, Seoul (KR)

(72) Inventor: Yu-Seorg Jeong, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/789,001

(22) Filed: Oct. 20, 2017

(65) Prior Publication Data

US 2018/0154816 A1    Jun. 7, 2018

(30) Foreign Application Priority Data

Dec. 7, 2016 (KR) .......................... 10-2016-0165962

(51) Int. Cl.
  *B60P 1/44* (2006.01)
  *B60R 5/04* (2006.01)
  *B66B 9/08* (2006.01)

(52) U.S. Cl.
  CPC ........... *B60P 1/4421* (2013.01); *B60P 1/4414* (2013.01); *B60R 5/041* (2013.01); *B66B 9/0815* (2013.01)

(58) Field of Classification Search
  CPC ....... B60P 1/022; B60P 1/4414; B60P 1/4421; B60P 1/4485; B60R 5/041; B66B 9/0815
  USPC ........ 414/409, 462, 522, 541, 546, 549, 595
  See application file for complete search history.

(56) References Cited

U.S. PATENT DOCUMENTS

| | | | | |
|---|---|---|---|---|
| 2,576,385 A * | 11/1951 | Bigsby | ................... | B60R 5/041 224/42.33 |
| 2,953,287 A * | 9/1960 | Werner | ..................... | B60R 5/04 224/42.32 |
| 4,073,395 A | 2/1978 | Clement | | |
| 4,573,854 A | 3/1986 | McFarland | | |
| 5,131,502 A * | 7/1992 | Sermi | ..................... | B63B 27/16 114/72 |
| 5,544,796 A * | 8/1996 | Dubach | ................... | B60R 9/042 224/310 |
| 5,846,045 A * | 12/1998 | Johnson | ................ | B60P 1/6454 414/462 |
| 6,533,525 B2 * | 3/2003 | Haid | ....................... | B60P 1/003 14/69.5 |
| 6,918,734 B2 * | 7/2005 | Nick | ....................... | B60P 1/003 224/281 |
| 9,469,233 B2 * | 10/2016 | Cha | ........................... | B60P 1/44 |
| 9,914,436 B2 * | 3/2018 | Almalki | .................. | B60S 1/485 |
| 2002/0034430 A1 * | 3/2002 | Sotiroff | .................... | B60J 5/047 414/462 |

(Continued)

FOREIGN PATENT DOCUMENTS

JP        2010-076766 A       4/2010

*Primary Examiner* — James Keenan
(74) *Attorney, Agent, or Firm* — Morgan, Lewis & Bockius LLP (57) ABSTRACT

A luggage loading and unloading apparatus for a vehicle may include an in-wheel motor roller rotating a wheel by driving force of a motor, a slider coupled to a plate for loading luggage, and a link, one side of which is coupled to the in-wheel motor roller while the other side of the link is coupled to the slider, wherein the in-wheel motor roller is driven together with the slider, lifting and dropping the plate.

11 Claims, 7 Drawing Sheets

(56) References Cited

U.S. PATENT DOCUMENTS

| | | | |
|---|---|---|---|
| 2005/0002768 A1* | 1/2005 | Nick | B60R 5/04 |
| | | | 414/522 |
| 2005/0008466 A1 | 1/2005 | Albrecht et al. | |
| 2008/0191507 A1* | 8/2008 | Farber | B60P 1/4421 |
| | | | 296/57.1 |

* cited by examiner

LUGGAGE LOADING AND UNLOADING APPARATUS FOR VEHICLE

CROSS-REFERENCE(S) TO RELATED APPLICATIONS

The present application claims priority to Korean Patent Application No. 10-2016-0165962, filed on Dec. 7, 2016, the entire contents of which is incorporated herein for all purposes by this reference.

BACKGROUND OF THE INVENTION

Field of the Invention

The present invention relate to a loading and unloading apparatus for loading or unloading heavy luggage into or from a vehicle trunk.

Description of Related Art

A trunk arranged in the rear of a vehicle is a space provided for loading and unloading the luggage of passengers.

Since a bumper cover with a built-in bumper is arranged in the rear end of the vehicle, luggage must be lifted above the bumper cover in order to load and unload the luggage into and from the vehicle.

There is no problem for light and small luggage. However, it is not easy to lift and load heavy and large luggage and to lift and unload the luggage again due to the height of the rear end.

This is a hard issue for aged drivers or fragile female drivers, and these drivers may nearly injure their joints and the like.

Meanwhile, special vehicles such as welfare vehicles for the disabled include a lift-up device for lifting and dropping luggage or wheelchairs. However, since the device has a slight complicated structure, requires a large occupied space, and is exposed in external appearance, it is impossible to apply the device to mass-produced vehicles.

Although vehicle having rear ends as low as possible have been developed in order to improve these problems, there are still difficulties.

The foregoing is intended merely to aid in the understanding of the background of the present invention, and is not intended to mean that the present invention falls within the purview of the related art that is already known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a luggage loading and unloading apparatus for a vehicle, which is applicable to typical mass-produced vehicles since it can easily load and unload luggage into and from a vehicle trunk and is not heavily exposed in external appearance.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a luggage loading and unloading apparatus for a vehicle includes an in-wheel motor roller rotating a wheel by driving force of a motor, a slider coupled to a plate for loading luggage, and a link, one side of which is coupled to the in-wheel motor roller while the other side of the link is coupled to the slider, wherein the in-wheel motor roller is driven together with the slider, lifting and dropping the plate.

The luggage loading and unloading apparatus may further include a guide mounted into a trunk of a vehicle, and the in-wheel motor roller and the slider may be operated within the guide.

The guide may include a floor seating portion seated on a rear floor of the vehicle, a panel coupling portion mounted to a back panel of the vehicle, and a beam coupling portion mounted to a back beam of the vehicle.

The guide may further include an inclined portion obliquely disposed between the panel coupling portion and the beam coupling portion.

The guide may further include a board horizontal portion extending from the panel coupling portion to be smoothly mounted on a lower surface of a luggage board of the vehicle.

The board horizontal portion may have a lower height than the panel coupling portion.

The slider may have a triangular shape.

The link may be coupled to one edge portion of the slider.

The link may have a longitudinally curved shape.

The guide may be opened only at one side thereof.

In accordance with another exemplary embodiment of the present invention, a luggage loading and unloading apparatus for a vehicle includes an in-wheel motor roller rotating a wheel by driving force of a motor, a slider coupled to a plate for loading luggage, a guide mounted into a trunk of a vehicle to guide paths of the in-wheel motor roller and the slider, and a link, one side of which is coupled to the in-wheel motor roller while the other side of the link is coupled to the slider, the link having a longitudinally curved shape.

The guide may include a floor seating portion seated on a rear floor of the vehicle, a panel coupling portion mounted to a back panel of the vehicle, and a beam coupling portion mounted to a back beam of the vehicle.

The guide may further include an inclined portion obliquely disposed between the panel coupling portion and the beam coupling portion.

The guide may further include a board horizontal portion extending from the panel coupling portion to be smoothly mounted on a lower surface of a luggage board of the vehicle, the board horizontal portion being mounted at a lower height than the panel coupling portion.

The guide may be opened only at one side thereof.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

In certain embodiments, detailed descriptions of device constructions or processes well known in the art may be omitted to avoid obscuring appreciation of the disclosure by a person of ordinary skill in the art.

Figure 1:
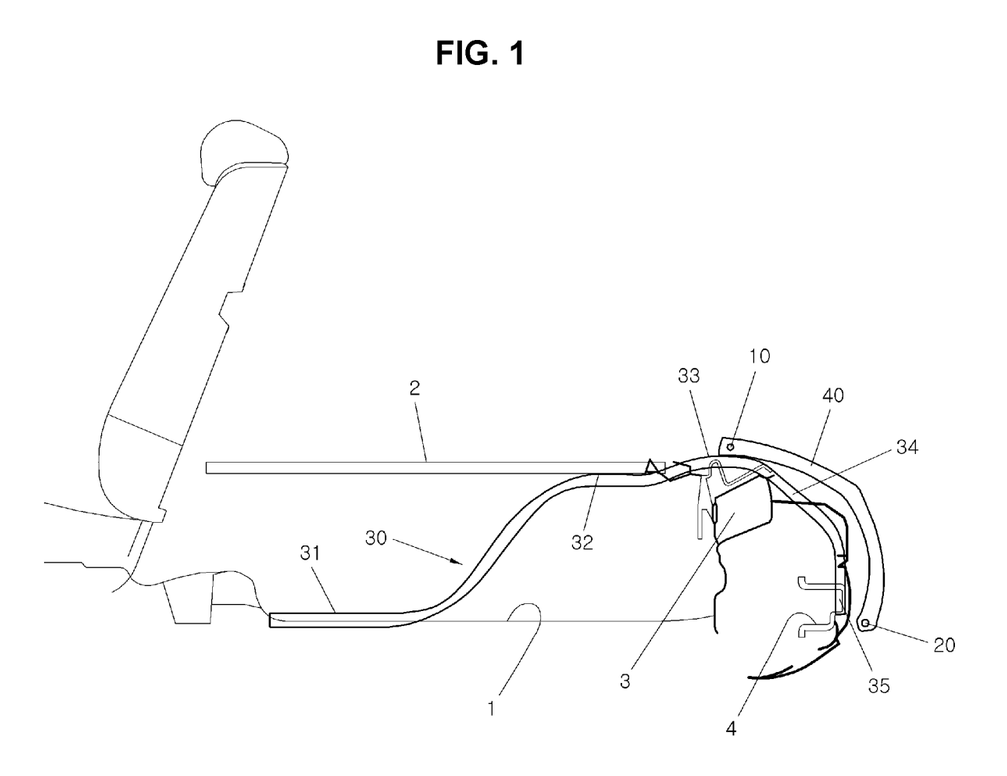
FIG. 1 is a view schematically illustrating a luggage loading and unloading apparatus for a vehicle according to an exemplary embodiment of the present invention.
Figure 2:
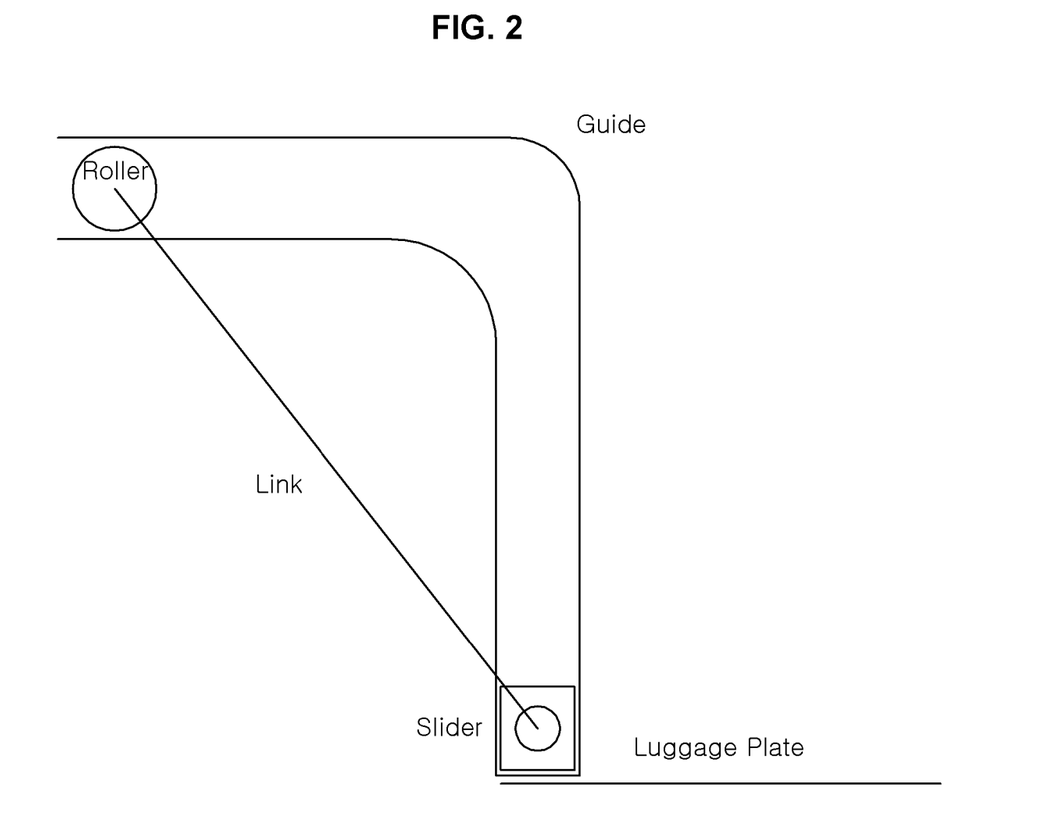
FIG. 2 and FIG. 3 are conceptual views for explaining the luggage loading and unloading apparatus for a vehicle according to the exemplary embodiment of the present invention.
Figure 3:
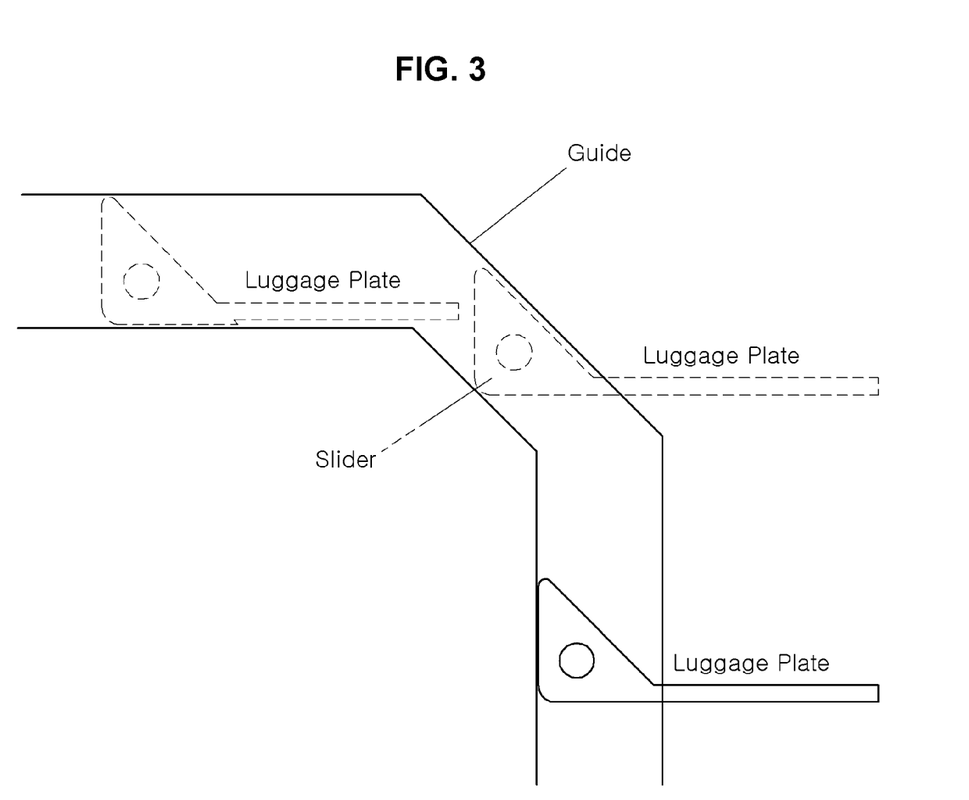

FIG. 1 is a view schematically illustrating a luggage loading and unloading apparatus for a vehicle according to an exemplary embodiment of the present invention. FIG. 2 and FIG. 3 are conceptual views for explaining the luggage loading and unloading apparatus for a vehicle according to the exemplary embodiment of the present invention.

Hereinafter, the loading and unloading apparatus for a vehicle according to the exemplary embodiment of the present invention will be described with reference to FIG. 1, FIG. 2, and FIG. 3.

The loading and unloading apparatus for a vehicle according to the exemplary embodiment of the present invention is an apparatus which is mounted to the trunk or the rear end portion of a typical commercial vehicle to easily load or unload luggage into or from the trunk.

To this end, the loading and unloading apparatus for a vehicle includes an in-wheel motor roller, a slider, a guide 30, a link 40, and a plate 50.

The guide 30 is mounted to a rear floor 1, a back panel 3, and a back beam 4. The in-wheel motor roller and the slider are operated along the guide 30 to load or unload luggage which is placed on the plate 50 coupled to the slider.

The in-wheel motor roller is rotatably coupled to a roller coupling end portion 10 of the link 40, and a wheel built therein rolls and rotates by the driving force of a motor.

The in-wheel motor roller and the slider are interconnected by the link 40 such that the slider may be operated depending on the operation of the in-wheel motor roller.

The slider is coupled to a slider coupling end portion 20 of the link 40, and the plate 50 is coupled to the slider so that the position of the plate 50 is changed along with the slider.

As illustrated in the drawings, since the link 40 has a longitudinally curved shape, the link 40 may not conflict with the trunk and the guide 30 and the slider may be guided along the guide 30.

The luggage loading and unloading apparatus having such a structure not be heavily exposed in external appearance in the vehicle to apply the apparatus to the typical commercial vehicle. In addition, it is necessary to safely mount the apparatus to the vehicle for transportation of heavy luggage.

To this end, the guide 30 has one opened surface and three closed surfaces on the basis of the rear of the vehicle, and includes a floor seating portion 31, a board horizontal portion 32, a panel coupling portion 33, an inclined portion 34, and a beam coupling portion 35.

The floor seating portion 31 is a portion which is smoothly mounted to the rear floor 1 such that the link 40 and the plate 50 may be disposed on the rear floor 1 without exposure to the outside and may be covered by a luggage board 2 when the apparatus does not transport luggage.

The board horizontal portion 32 is a portion which is smoothly mounted on the lower surface of the luggage board 2 to position the guide 30 such that the plate 50 may be seated on the luggage board 2 after reaching the highest position.

The panel coupling portion 33 is a portion which is mounted to the back panel 3 of the vehicle such that the guide 30 bent toward the rear end portion thereof from the board horizontal portion 32 is securely mounted to the vehicle and is not exposed in external appearance. The plate 50 is located at the highest position when it reaches the panel coupling portion 33.

The beam coupling portion 35 is a portion corresponding to the rearmost end portion of the guide 30, and is vertically formed such that luggage may be loaded or unloaded when the plate 50 is located at the beam coupling portion 35. The beam coupling portion 35 is mounted to the back beam of the vehicle such that the guide 30 is securely mounted to the vehicle and is not exposed in external appearance.

The inclined portion 34 between the panel coupling portion 33 and the beam coupling portion 35 forms an angle of inclination when viewed from the side.

For the configuration of the guide 30 as described above, the luggage board 2 and a bumper cover disposed in the rearmost end portion of the vehicle are partially cut such that the link 40 and the plate 50 may be exposed for transportation.

As illustrated in FIG. 3, the slider has a triangular shape to be suited for the movement of the slider and the plate 50. That is, the triangular slider is more advantageous to horizontally maintain the lifting and dropping plate 50.

To this end, the link 40 is preferably coupled to one edge portion of the triangular slider. The upper edge portion in the drawing is an edge portion coupled to the link 40.

As illustrated in the drawing, the slider having a triangular shape in section is safely movable by seating the short side of the slider on the guide when the slider is located at the beam coupling portion 35 and the panel coupling portion 33. When the slider moves along the inclined portion 34, the slider may horizontally transport the plate 50 in the state in which the edge portion of the slider, the internal angle of which is a right angle, is in contact with the inside of the guide 30 and the slider maintains its center of gravity.

To this end, the side of the inclined portion 34 is preferably alongside of the long side of the slider, as illustrated in the drawing.

The operation of the luggage loading and unloading apparatus for a vehicle having the above-mentioned structure according to the exemplary embodiment of the present invention will be described with reference to FIG. 4, FIG. 5, FIG. 6, and FIG. 7.

Figure 4:
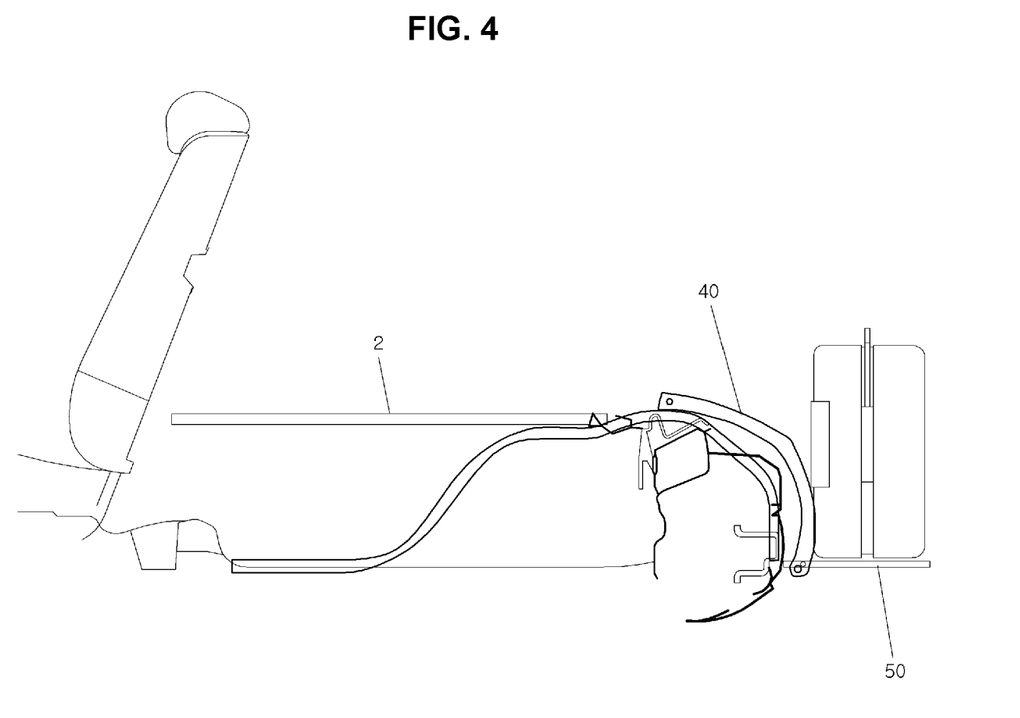
FIG. 4, FIG. 5, FIG. 6, and FIG. 7 are views illustrating a process of loading and unloading luggage using the luggage loading and unloading apparatus for a vehicle according to the exemplary embodiment of the present invention.

As illustrated in FIG. 4, when the slider and the plate 50 are coupled to the beam coupling portion 35 of the guide 30 and are located at the lowest position, luggage is loaded on or unloaded from the plate 50.

In the instant case, the link 40 is exposed to the outside of the trunk, and the roller coupling end portion 10 is substantially located at the panel coupling portion 33.

In this state, when the in-wheel motor roller is operated along the guide 30 in the forward direction of the vehicle by the driving of the motor, the link 40, and the slider and the plate 50 connected thereto are moved forward of the vehicle together. Consequently, the plate 50 is moved upward as illustrated in FIG. 5.

Figure 5:
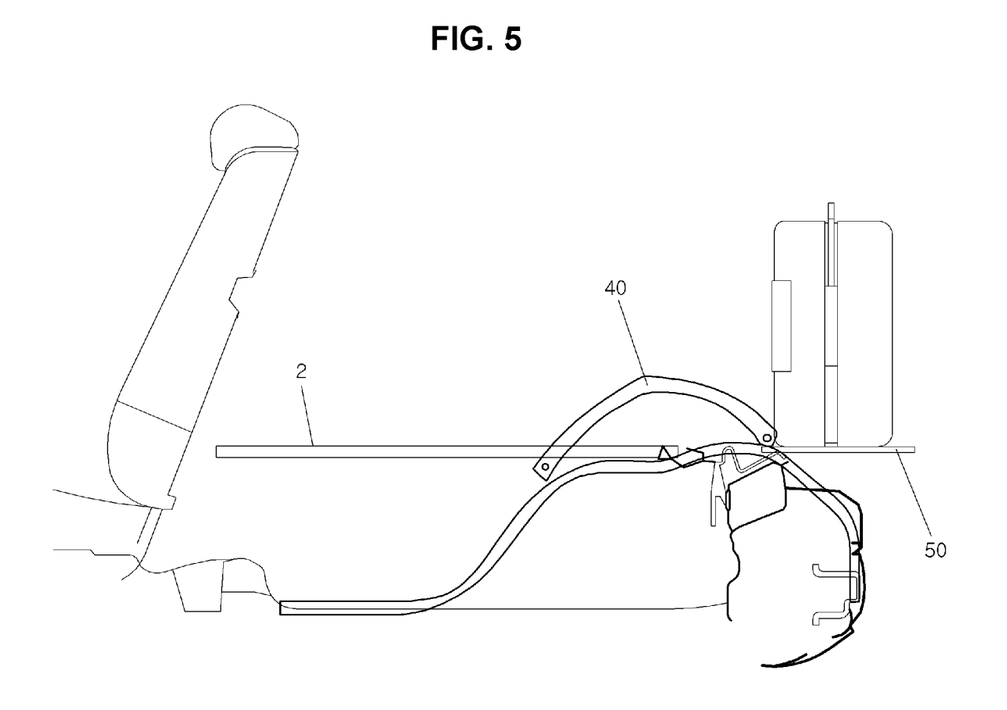

The curved link 40 is in a state illustrated in FIG. 5. To this end, a portion of the luggage board 2 is partially open to the link side.

Figure 6:
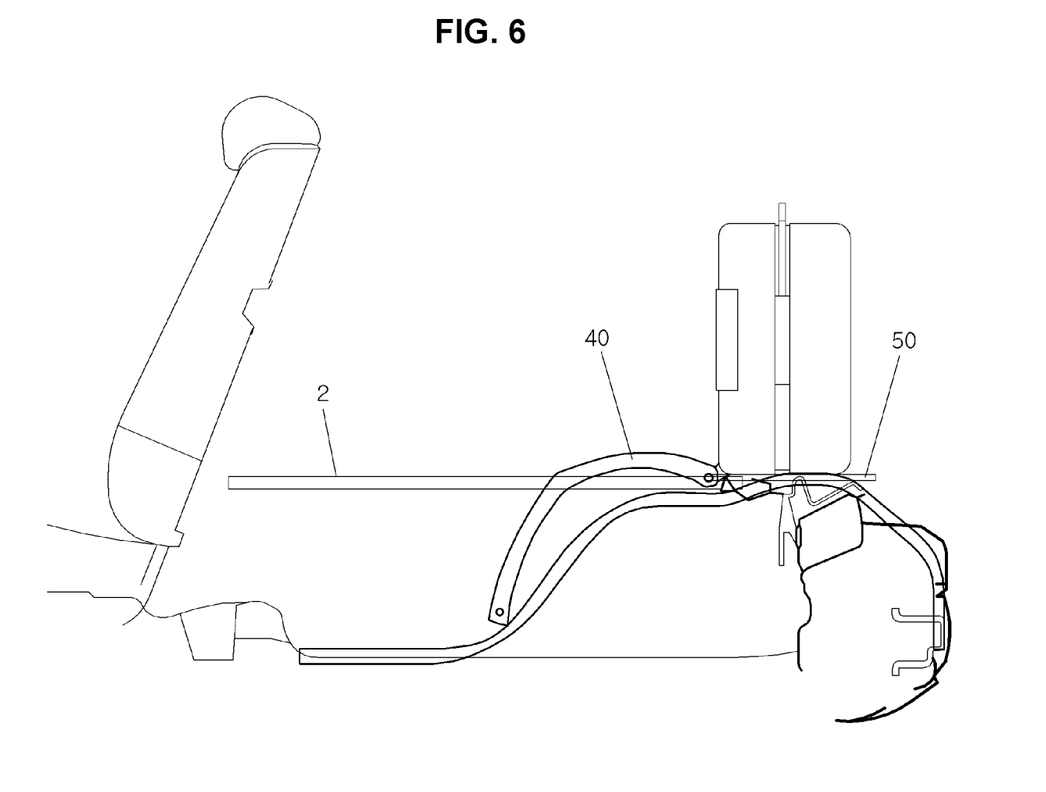

When the in-wheel motor roller is further moved, the plate 50 is located at the highest position as illustrated in FIG. 6. In the instant case, the plate 50 is located on the panel coupling portion 33 of the guide 30.

Figure 7:
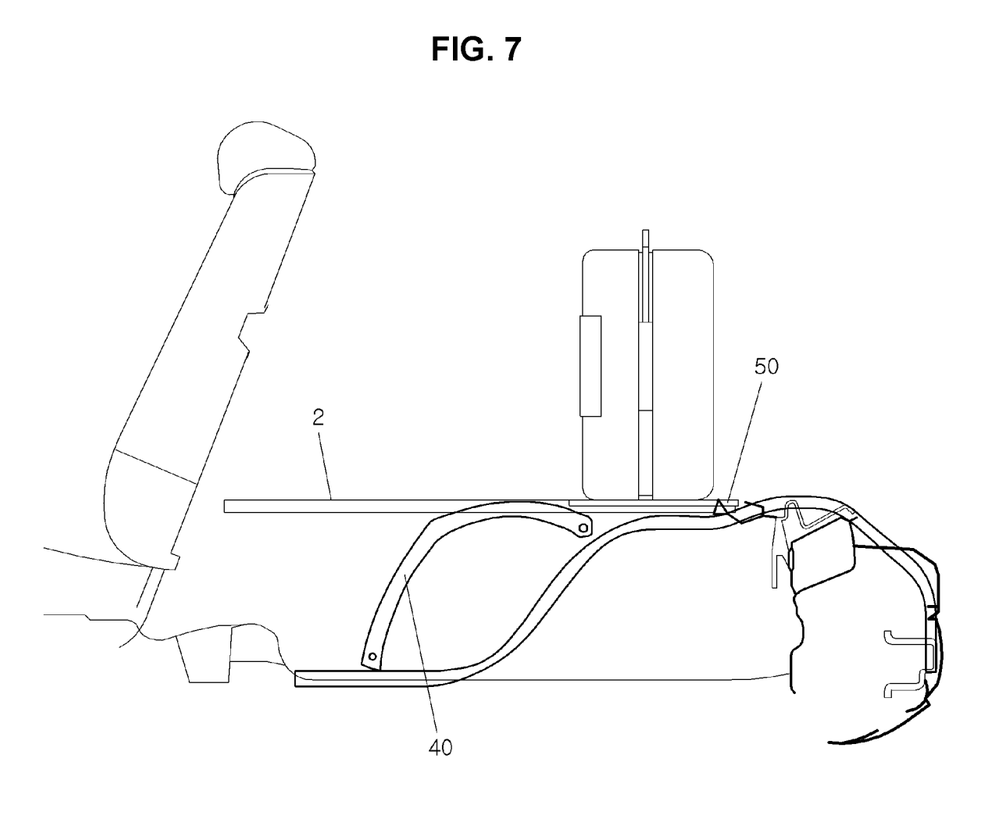

Next, as illustrated in FIG. 7, the link 40 is moved downward of the luggage board 2 so as not to be exposed in external appearance, and is located in the space between the luggage board 2 and the rear floor 1.

The plate 50 is seated on and supported by the luggage board 2, and thus the movement of luggage into the trunk is completed.

The process of unloading the luggage may be performed by operating the apparatus in reverse order.

As described above, the luggage loading and unloading apparatus for a vehicle according to the exemplary embodiment of the present invention includes the guide which is securely and properly disposed therein for stable transportation of luggage, and is embodied on the guide by the simple structure of the in-wheel motor roller and the link. Thus, the luggage loading and unloading apparatus can be minimally exposed in external appearance in the vehicle, and a vehicle user can easily load and unload luggage into and from the trunk by properly transporting the luggage on the plate.

In accordance with a luggage loading and unloading apparatus for a vehicle according to exemplary embodiments of the present invention, it is possible to easily load and unload luggage using a relatively simple and cheap device, compared to large and expensive devices including six-joint links applied to welfare vehicles.

Since the luggage loading and unloading apparatus has a proper height to load and unload luggage on and from a luggage plate, it does not impose a burden on the human body.

The luggage loading and unloading apparatus can have a suitable layout to be hardly exposed through a vehicle trunk, and thus can be easily applied to typical mass-produced vehicles.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A luggage loading and unloading apparatus for a vehicle, the luggage loading and unloading apparatus comprising:
    an in-wheel motor roller;
    a slider fixed to a plate for loading luggage;
    a link, a first side of which is coupled to the in-wheel motor roller while a second side of the link is coupled to the slider; and
    a guide configured to be mounted into a trunk of the vehicle, the in-wheel motor roller and the slider being engaged to the guide,
    wherein the in-wheel motor roller is selectively driven together with the slider along the guide so that the slider selectively moves the plate according to a movement of the slider, and
    wherein the guide includes:
        a floor seating portion configured to be mounted on a rear floor of the vehicle;
        a panel coupling portion configured to be fixed to a back panel of the vehicle; and
        a beam coupling portion configured to be fixed to a back beam of the vehicle.

2. The luggage loading and unloading apparatus of claim 1, wherein the in-wheel motor roller and the slider are operated within the guide.

3. The luggage loading and unloading apparatus of claim 1, wherein the guide further includes an inclined portion obliquely disposed between the panel coupling portion and the beam coupling portion.

4. The luggage loading and unloading apparatus of claim 3, wherein the guide further includes a board horizontal portion extending from the panel coupling portion and configured to be mounted on a lower surface of a luggage board of the vehicle.

5. The luggage loading and unloading apparatus of claim 4, wherein the board horizontal portion has a lower height than the panel coupling portion.

6. The luggage loading and unloading apparatus of claim 5, wherein the slider has a triangular shape.

7. The luggage loading and unloading apparatus of claim 6, wherein the link is coupled to an edge portion of the slider.

8. The luggage loading and unloading apparatus of claim 7, wherein the link has a longitudinally curved shape.

9. A luggage loading and unloading apparatus for a vehicle, the luggage loading and unloading apparatus including:
    an in-wheel motor roller,
    a slider fixed to a plate for loading luggage;

a guide configured to be mounted into a trunk of the vehicle, wherein the in-wheel motor roller and the slider are engaged to the guide; and a link, a first side of which is coupled to the in-wheel motor roller while a second side of the link is coupled to the slider, the link having a longitudinally curved shape, wherein the guide guides paths of the in-wheel motor roller and the slider, and wherein the guide includes:

a floor seating portion configured to be mounted on a rear floor of the vehicle;

a panel coupling portion configured to be fixed to a back panel of the vehicle; and a beam coupling portion configured to be fixed to a back beam of the vehicle.

10. The luggage loading and unloading apparatus of claim 9, wherein the guide further includes an inclined portion obliquely disposed between the panel coupling portion and the beam coupling portion.

11. The luggage loading and unloading apparatus of claim 10, wherein the guide further includes a board horizontal portion extending from the panel coupling portion and configured to be mounted on a lower surface of a luggage board of the vehicle, the board horizontal portion being mounted at a lower height than the panel coupling portion.

* * * * *